US012762005B2

(12) United States Patent
Panikkar et al.

(10) Patent No.: US 12,762,005 B2
(45) Date of Patent: Oct. 13, 2026

(54) MACHINE LEARNING-BASED ISSUE REMEDIATION UTILIZING AN APPLICATION TOPOLOGY GRAPH REPRESENTATION

(71) Applicant: Dell Products L.P., Round Rock, TX (US)

(72) Inventors: Shibi Panikkar, Bangalore (IN); Ravuru Vijaya Sankar, Bangalore (IN); Nagarajan Thiruvellore, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/034,975

(22) Filed: Jan. 23, 2025

(65) Prior Publication Data

US 2026/0211763 A1 Jul. 23, 2026

(51) Int. Cl.

| | |
|---|---|
| ***G06F 11/07*** | (2006.01) |
| ***G06F 11/30*** | (2006.01) |
| ***G06F 16/901*** | (2019.01) |

(52) U.S. Cl.

CPC ........ *G06F 11/079* (2013.01); *G06F 11/0793* (2013.01); *G06F 11/302* (2013.01); *G06F 16/9024* (2019.01)

(58) Field of Classification Search

CPC ............... G06F 11/079; G06F 16/9024; G06F 11/0793; G06F 11/302

See application file for complete search history.

(56) References Cited

U.S. PATENT DOCUMENTS

2024/0345911 A1* 10/2024 Bellam ............... G06F 11/0709

OTHER PUBLICATIONS

Ahmed, T., Ghosh, S., Bansal, C., Zimmermann, T., Zhang, X., Rajmohan, S. "Recommending Root-Cause and Mitigation Steps for Cloud Incidents using Large Language Models". Feb. 9, 2023. Retrieved from the Internet <URL:https://arxiv.org/abs/2301.03797> (Year: 2023).*

(Continued)

*Primary Examiner* — Ashish Thomas
*Assistant Examiner* — Bryan P Huang
(74) *Attorney, Agent, or Firm* — Ryan, Mason & Lewis, LLP

(57) ABSTRACT

An apparatus comprises at least one processing device configured to determine an incident comprising a natural language description of one or more issues encountered in an application ecosystem, and to process the natural language description and an application topology graph representation of the application ecosystem utilizing a machine learning model, the application topology graph representation comprising nodes each representing an application and edges connecting the nodes representing dependency relationships between the applications. The at least one processing device is further configured to determine, based on an output of the machine learning model, (i) a subset of applications as probable sources of the issues and (ii) issue resolution information for remediating the issues. The at least one processing device is further configured to remediate, in one or more applications in the determined subset, the issues encountered in the application ecosystem based on the determined issue resolution information.

20 Claims, 15 Drawing Sheets

(56) References Cited

OTHER PUBLICATIONS

Han, Y., Du, Q., Huang, Y., Wu, J., Tian, F., He, C. "The Potential of One-Shot Failure Root Cause Analysis: Collaboration of the Large Language Model and Small Classifier". Oct. 27, 2024. Retrieved from the Internet <URL:https://dl.acm.org/doi/10.1145/3691620.3695475> (Year: 2024).*
Ce Zhou et al., "A Comprehensive Survey on Pretrained Foundation Models: A History from BERT to ChatGPT," May 1, 2023, 99 pages, https://doi.org/10.48550/arXiv.2302.09419.
Shervin Minaee et al., "Large Language Models: A Survey", Feb. 20, 2024, 43 pages, arXiv:2402.06196v2 [cs. CL].
Ashish Vaswani et al., "Attention Is All You Need", 31st Conference on Neural Information Processing Systems, Long Beach, CA, 2017, 11 pages.

* cited by examiner

500

NODE: DSA-Catalog

APPLICATION: SHOW THE PRODUCT CATALOG TO THE USER
APPLICATION TYPE: USER INTERFACE AND BACKEND APIs
TECHNOLOGIES USED IN THE FRONTEND: React JS, .NET Framework
TECHNOLOGIES USED IN THE BACKEND: MICROSERVICES, KAFKA

FIG. 5

1000

```
# Create a directed graph
graph = nx.DiGraph()

# Add nodes (applications)
for i in range(1, 11):
    app_name = f"App{i}" # e.g., App1, App2, …
    app_description – "…" # Add a description for each application
    graph.add_node(app_name, description=app_description)

# Add edges (relationships) with attributes
graph.add_edge("App1", "App4", type="DATA_FLOW")
graph.add_edge("App5", "App3", type="DEPENDS_On")
# … add other edges with appropriate types

# Example of accessing node properties
app1_description = graph.nodes["App1"]["description"]
```

FIG. 10

1100

```
from sentence_transformers import SentenceTransformer

# Load pre-trained BERT model
model = SentenceTransformer('all-MiniLM-L6-V2')

# Function to get embedding for a node
def get_node_embedding(node_name):
    description = graph.nodes[node_name]["description"]
    embedding = model.encode(description)
    return embedding

# Example usage
app1_embedding = get_node_embedding("App1")
```

FIG. 11

1200

```
# Calculate cosine similarities
similarities = cosine_similarity(error_embedding.reshape(1, -1), app_embeddings)

# Rank applications based on similarity
ranked_apps = sorted(enumerate(similarities[0]), key=lambda x: x[1], reverse=True)

# Print top 3 most similar applications
for i, similarity in ranked_apps[:3]:
    print(f"App{i+1}: Similarity Score = {similarity:.4f}")
```

FIG. 12

1300

```
# Sample data (assuming embedding dimension is 100)
error_embedding = model.encode("pricing is not accurate") # BERT embedding
node_embeddings = torch.randn(10, 100) # Embeddings of 10 applications
code_change_features = torch.zeros(10, 1) # Feature for recent code changes
code_change_features[2] = 1 # Mark App3 as having recent code change

# Attention layer
attention_layer = ApplicationAttention(100)

# Calculate context vector
context_vector = attention_layer(error_embedding, node_embeddings, code_change_features)

# LLM processing (hypothetical)
# ...LLM takes context_vector and error_embedding as input
# ...LLM outputs App3 as the most likely source of error
```

FIG. 13

MACHINE LEARNING-BASED ISSUE REMEDIATION UTILIZING AN APPLICATION TOPOLOGY GRAPH REPRESENTATION

BACKGROUND

As the value and use of information continues to increase, individuals and businesses seek additional ways to process and store information. Information processing systems may be used to process, compile, store and communicate various types of information, including through the use of artificial intelligence (AI) and machine learning (ML). Large language models (LLMs) are a type of AI system that uses ML algorithms to process vast amounts of natural language text data. LLMs may be used to perform various natural language processing (NLP) tasks, including text classification, text summarization, text generation, named entity recognition, text sentiment analysis, and question answering.

SUMMARY

Illustrative embodiments of the present disclosure provide techniques for machine learning-based issue remediation utilizing an application topology graph representation of an application ecosystem.

In one embodiment, an apparatus comprises at least one processing device comprising a processor coupled to a memory. The at least one processing device is configured to determine an incident associated with an application ecosystem comprising a plurality of applications running on an information technology infrastructure, the incident comprising a natural language description of one or more issues encountered in the application ecosystem. The at least one processing device is also configured to process the natural language description of the one or more issues encountered in the application ecosystem and at least a portion of an application topology graph representation of the application ecosystem utilizing a machine learning model, the application topology graph representation comprising a plurality of nodes each representing one of the plurality of applications and edges connecting the nodes representing dependency relationships between the plurality of applications. The at least one processing device is further configured to determine, based at least in part on an output of the machine learning model, (i) a subset of the plurality of applications in the application ecosystem as probable sources of the one or more issues encountered in the application ecosystem and (ii) issue resolution information for remediating the one or more issues in the subset of the plurality of applications in the application ecosystem. The at least one processing device is further configured to remediate, in one or more of the applications in the determined subset of the plurality of applications, the one or more issues encountered in the application ecosystem based at least in part on the determined issue resolution information.

These and other illustrative embodiments include, without limitation, methods, apparatus, networks, systems and processor-readable storage media.

BRIEF DESCRIPTION OF THE DRAWINGS

FIG. 5 shows an application node of a graph-based representation of an application ecosystem in an illustrative embodiment.

FIG. 10 shows pseudocode for generating a graph-based representation of an application ecosystem in an illustrative embodiment.

FIG. 11 shows pseudocode for embedding a graph-based representation of an application ecosystem in a vector database in an illustrative embodiment.

FIG. 12 shows pseudocode for performing semantic similarity searching in graph nodes of a graph-based representation of an application ecosystem in an illustrative embodiment.

FIG. 13 shows pseudocode for implementing an attention mechanism for identifying applications which are probable causes of errors in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
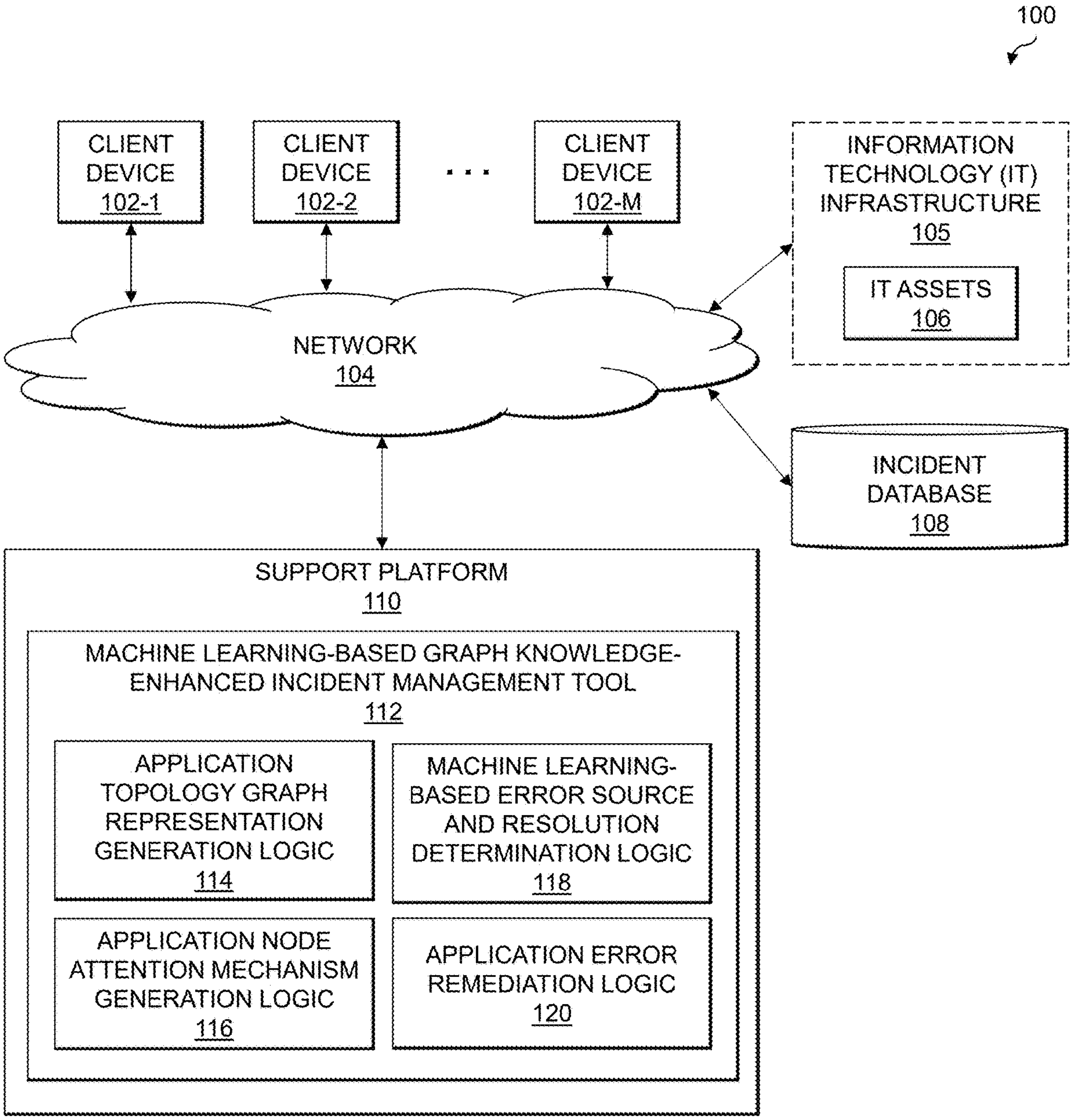
FIG. 1 is a block diagram of an information processing system configured for machine learning-based issue remediation utilizing an application topology graph representation of an application ecosystem in an illustrative embodiment.

FIG. 1 shows an information processing system 100 configured in accordance with an illustrative embodiment. The information processing system 100 is assumed to be built on at least one processing platform and provides functionality for machine learning-based issue remediation utilizing an application topology graph representation of an application ecosystem. The information processing system 100 includes a set of client devices 102-1, 102-2, . . . 102-M (collectively, client devices 102) which are coupled to a network 104. Also coupled to the network 104 is an IT infrastructure 105 comprising one or more IT assets 106, an incident database 108, and a support platform 110. The IT assets 106 may comprise physical and/or virtual computing resources in the IT infrastructure 105. Physical computing resources may include physical hardware such as servers, storage systems, networking equipment, Internet of Things (IoT) devices, other types of processing and computing devices including desktops, laptops, tablets, smartphones, etc. Virtual computing resources may include virtual machines (VMs), containers, etc.

In some embodiments, the support platform 110 is used for an enterprise system. For example, an enterprise may subscribe to or otherwise utilize the support platform 110 for performing incident management for errors encountered in the IT infrastructure 105 (e.g., in an ecosystem of a plurality of applications running on the IT assets 106 of the IT infrastructure 105, where the applications have dependencies between them). The support platform 110 implements a machine learning-based graph knowledge-enhanced incident management tool 112 to determine the sources of errors (e.g., ones of the applications running on the IT assets 106 of the IT infrastructure 105), and for applying error resolutions to the determined sources. As used herein, the term "enterprise system" is intended to be construed broadly to include any group of systems or other computing devices. For example, the IT assets 106 of the IT infrastructure 105 may provide a portion of one or more enterprise systems. A given enterprise system may also or alternatively include one or more of the client devices 102. In some embodiments, an enterprise system includes one or more data centers, cloud infrastructure comprising one or more clouds, etc. A given enterprise system, such as cloud infrastructure, may host assets that are associated with multiple enterprises (e.g., two or more different businesses, organizations or other entities).

The client devices 102 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 102 may also or alternately comprise virtualized computing resources, such as VMs, containers, etc.

The client devices 102 in some embodiments comprise respective computers associated with a particular company, organization or other enterprise. Thus, the client devices 102 may be considered examples of assets of an enterprise system. In addition, at least portions of the information processing system 100 may also be referred to herein as collectively comprising one or more "enterprises." Numerous other operating scenarios involving a wide variety of different types and arrangements of processing nodes are possible, as will be appreciated by those skilled in the art.

The network 104 is assumed to comprise a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks.

The incident database 108 is configured to store and record various information that is utilized by the support platform 110 and the client devices 102. Such information may include, for example, information that is collected regarding operation of the IT assets 106 of the IT infrastructure 105 (e.g., encountered errors, error descriptions, error resolutions, etc.), graph-based representations of an application ecosystem running on the IT assets 106 of the IT infrastructure 105, machine learning models and associated data used in determining the applications which are likely sources of errors, etc. In some embodiments, the machine learning models include one or more Large Language Models (LLMs), and one or more LLM-agents which performed designated functionality such as error location, error analysis, report generation, etc. The support platform 110 may be utilized by the client devices 102 to perform troubleshooting and remediation of issues or errors encountered on the IT assets 106 of the IT infrastructure 105. The incident database 108 may be implemented utilizing one or more storage systems. The term "storage system" as used herein is intended to be broadly construed. A given storage system, as the term is broadly used herein, can comprise, for example, content addressable storage, flash-based storage, network-attached storage (NAS), storage area networks (SANs), direct-attached storage (DAS) and distributed DAS, as well as combinations of these and other storage types, including software-defined storage. Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the support platform 110, as well as to support communication between the support platform 110 and other related systems and devices not explicitly shown.

The support platform 110 may be provided as a cloud service that is accessible by one or more of the client devices 102 to allow users thereof to perform incident management for issues or errors encountered in an application ecosystem that is implemented by the IT assets 106 of the IT infrastructure 105. The client devices 102 may be configured to access or otherwise utilize the support platform 110 (e.g., to perform searches, including searches related to issues encountered on the IT assets 106 of the IT infrastructure 105, troubleshooting and remediation of issues encountered on the IT assets 106 of the IT infrastructure 105, etc.). In some embodiments, the client devices 102 are assumed to be associated with software developers, system administrators, IT managers or other authorized personnel responsible for managing the IT assets 106 of the IT infrastructure 105. In some embodiments, the IT assets 106 of the IT infrastructure 105 are owned or operated by the same enterprise that operates the support platform 110. In other embodiments, the IT assets 106 of the IT infrastructure 105 may be owned or operated by one or more enterprises different than the enterprise which operates the support platform 110 (e.g., a first enterprise provides support for multiple different customers, businesses, etc.). Various other examples are possible.

In some embodiments, the client devices 102 and/or the IT assets 106 of the IT infrastructure 105 may implement host agents that are configured for automated transmission of information with the incident database 108 and the support platform 110 regarding searches (e.g., queries, answers to queries, etc.). It should be noted that a "host agent" as this term is generally used herein may comprise an automated entity, such as a software entity running on a processing device. Accordingly, a host agent need not be a human entity.

The support platform 110 in the FIG. 1 embodiment is assumed to be implemented using at least one processing device. Each such processing device generally comprises at least one processor and an associated memory, and implements one or more functional modules or logic for controlling certain features of the support platform 110. In the FIG. 1 embodiment, the support platform 110 implements the machine learning-based graph knowledge-enhanced incident management tool 112. The machine learning-based graph knowledge-enhanced incident management tool 112 comprises application topology graph representation generation logic 114, application node attention mechanism generation logic 116, machine learning-based error source and resolution determination logic 118, and application error remediation logic 120. The application topology graph representation generation logic 114 is configured to generate a graph representation of an application ecosystem (e.g., a set of applications implemented by the IT assets 106 of the IT infrastructure 105), where the graph representation includes nodes representing the applications and edges between the application nodes representing dependencies between the applications. The application nodes may be associated with error attributes, characterizing errors encountered for a particular application (e.g., including error descriptions, error resolutions if any, etc.). The application node attention mechanism generation logic 116 is configured to implement an attention mechanism, by supplementing one or more of the application nodes of the graph representation with attention information (e.g., so as to focus subsequent search on those application nodes). The attention information may be generated and associated with specific application nodes based on detecting various attention conditions, such as determining recent code changes for applications, detecting repeated errors for applications, etc. The machine learning-based error source and resolution determination logic 118 is configured to generate a vector embedding of the graph representation, and to utilize a machine learning model (e.g., a Large Language Model (LLM)) to perform a semantic search of similarity between an input error or issue (e.g., a natural language description thereof) and the application nodes of the graph representation, taking into account the error attribute information of the application nodes, dependencies among the application nodes, and the attention information for the application nodes. This may include determining a set of candidate applications which are probable sources of the encountered errors (e.g., possibly just a single candidate application), and any error resolution information from the error attribute information from the application nodes of the set of candidate applications. In some embodiments, the machine learning-based error source and resolution determination logic 118 generates an incident report, characterizing the likely source of encountered errors (e.g., one or more of the candidate applications) and potential resolutions for those errors, as well as information regarding users or teams that are responsible for the applications which are the likely source of the encountered errors. The application error remediation logic 120 is configured to utilize such incident reports or other outputs of the LLM in order to determine and apply error resolutions to remedy the encountered errors.

At least portions of the machine learning-based graph knowledge-enhanced incident management tool 112, the application topology graph representation generation logic 114, the application node attention mechanism generation logic 116, the machine learning-based error source and resolution determination logic 118 and the application error remediation logic 120 may be implemented at least in part in the form of software that is stored in memory and executed by a processor.

It is to be appreciated that the particular arrangement of the client devices 102, the IT infrastructure 105, the incident database 108 and the support platform 110 illustrated in the FIG. 1 embodiment is presented by way of example only, and alternative arrangements can be used in other embodiments. As discussed above, for example, the support platform 110 (or portions of components thereof, such as one or more of the machine learning-based graph knowledge-enhanced incident management tool 112, the application topology graph representation generation logic 114, the application node attention mechanism generation logic 116, the machine learning-based error source and resolution determination logic 118 and the application error remediation logic 120) may in some embodiments be implemented internal to the IT infrastructure 105.

The support platform 110 and other portions of the information processing system 100, as will be described in further detail below, may be part of cloud infrastructure.

The support platform 110 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 102, IT infrastructure 105, the IT assets 106, the incident database 108 and the support platform 110 or components thereof (e.g., the machine learning-based graph knowledge-enhanced incident management tool 112, the application topology graph representation generation logic 114, the application node attention mechanism generation logic 116, the machine learning-based error source and resolution determination logic 118 and the application error remediation logic 120) may be implemented on respective distinct processing platforms, although numerous other arrangements are possible. For example, in some embodiments at least portions of the support platform 110 and one or more of the client devices 102, the IT infrastructure 105, the IT assets 106 and/or the incident database 108 are implemented on the same processing platform. A given client device (e.g., 102-1) can therefore be implemented at least in part within at least one processing platform that implements at least a portion of the support platform 110.

The term "processing platform" as used herein is intended to be broadly construed so as to encompass, by way of illustration and without limitation, multiple sets of processing devices and associated storage systems that are configured to communicate over one or more networks. For example, distributed implementations of the information processing system 100 are possible, in which certain components of the system reside in one data center in a first geographic location while other components of the system reside in one or more other data centers in one or more other geographic locations that are potentially remote from the first geographic location. Thus, it is possible in some implementations of the information processing system 100 for the client devices 102, the IT infrastructure 105, IT assets 106, the incident database 108 and the support platform 110, or portions or components thereof, to reside in different data centers. Numerous other distributed implementations are possible. The support platform 110 can also be implemented in a distributed manner across multiple data centers.

Additional examples of processing platforms utilized to implement the support platform 110 and other components of the information processing system 100 in illustrative embodiments will be described in more detail below in conjunction with FIGS. 14 and 15.

It is to be understood that the particular set of elements shown in FIG. 1 for machine learning-based issue remediation utilizing an application topology graph representation of an application ecosystem is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for machine learning-based issue remediation utilizing an application topology graph representation of an application ecosystem will now be described in more detail with reference to the flow diagram of FIG. 2. It is to be understood that this particular process is only an example, and that additional or alternative processes for machine learning-based issue remediation utilizing an application topology graph representation of an application ecosystem may be used in other embodiments.

In this embodiment, the process includes steps 200 through 206. These steps are assumed to be performed by the support platform 110 utilizing the machine learning-based graph knowledge-enhanced incident management tool 112, the application topology graph representation generation logic 114, the application node attention mechanism generation logic 116, the machine learning-based error source and resolution determination logic 118 and the application error remediation logic 120. The process begins with step 200, determining an incident associated with an application ecosystem comprising a plurality of applications running on an IT infrastructure. The incident comprises a natural language description of one or more issues (or errors) encountered in the application ecosystem.

In step 202, the natural language description of the one or more issues encountered in the application ecosystem and at least a portion of an application topology graph representation of the application ecosystem are processed utilizing a machine learning model. The application topology graph representation comprises a plurality of nodes each representing one of the plurality of applications and edges connecting the nodes representing dependency relationships between the plurality of applications.

A given application node in the application topology graph representation may specify a given one of the plurality of applications, an application type of the given application, one or more front-end technologies utilized by the given application, and one or more back-end technologies utilized by the given application. A given edge in the application topology graph representation between a first application node associated with a first one of the plurality of applications and a second application node associated with a second one of the plurality of applications may specify a mode of communication between the first application and the second application, a communication format utilized for the communication between the first application and the second application, and an authentication model utilized for the communication between the first application and the second application.

At least one of the application nodes of the application topology graph representation for a given one of the plurality of applications may be associated with issue attribute information, the issue attribute information characterizing one or more historical issues encountered on the given application and issue resolution information for the one or more historical issues.

At least one of the application nodes of the application topology graph representation for a given one of the plurality of applications may be associated with attention information, the attention information being utilized by the machine learning model for performing a semantic search of the application topology graph representation with the natural language description of the one or more issues encountered in the application ecosystem. The attention information may be associated with said at least one of the application nodes in response to detecting one or more attention conditions. The one or more attention conditions may comprise detecting one or more code changes in a most recent release of the given application, and the attention information may characterize one or more code files of the given application having the one or more code changes and a number of lines of code that have changed. The one or more attention conditions may alternatively comprise detecting a given issue that is repeated at least a threshold number of times in the given application within a given time frame, and the attention information may characterize a description of the given issue and a resolution of the given issue.

The machine learning model may comprise a Large Language Model (LLM). The LLM may comprise an error locator agent configured to vectorize the natural language description of the one or more issues encountered in the application ecosystem and perform a similarity search of error attribute information associated with the plurality of nodes of the application topology graph representation. The LLM may also or alternatively comprise an error analyzer agent configured to implement a reverse traverse search of dependent nodes in the application topology graph representation starting from ones of the plurality of nodes determined to have associated error attribute information similar to the natural language description of the one or more issues encountered in the application ecosystem or ones of the plurality of nodes having associated attention information. The LLM may further or alternatively comprise a report generator agent configured to generate a report characterizing: a first set of one or more of the plurality of applications in the application ecosystem in which the one or more issues occurred or are determined to be a cause of the one or more issues, a second set of one or more of the plurality of applications in the application ecosystem having dependencies with the first set of one or more of the plurality of applications in the application ecosystem, and potential remediation actions for the one or more issues. The LLM may be configured to operate on vectorized embeddings of the application topology graph representation, where the vectorized embeddings comprise a vector embedding data structure associated with each of the plurality of application nodes, the vector embedding data structure characterizing error attribute information associated with each of the plurality of application nodes and any available attention information for the plurality of application nodes.

It should be noted that the term "data structure" as used herein is intended to be broadly construed. A data structure, such as any single one of or combination of the vector embedding data structures, the error attribute information, the attention information, etc. referred to above and elsewhere herein, may provide a portion of a larger data structure, or any one of or combination of such data structures may be combinations of multiple smaller data structures. Therefore, the data structures referred to above and elsewhere herein may be different parts of a same overall data structure, or one or more of the data structures could be made up of multiple smaller data structures. The data structures may include tables, vectors, embeddings, or various other data structures. In some embodiments, the data structures are specifically formatted or generated such that they are suitable for use as at least one of an input to and an output from a machine learning model. It should further be appreciated that "generating" a data structure may encompass, for example, populating an existing or previously-created data structure with one or more data items.

In step 204, (i) a subset of the plurality of applications in the application ecosystem as probable sources of the one or more issues encountered in the application ecosystem and (ii) issue resolution information for remediating the one or more issues in the subset of the plurality of applications in the application ecosystem are determined based at least in part on an output of the machine learning model. In step 206, the one or more issues encountered in the application ecosystem are remediated, in one or more of the determined subset of the plurality of applications, based at least in part on the determined issue resolution information. Remediating the one or more issues encountered in the application ecosystem based at least in part on the determined issue resolution information may comprise alerting one or more users responsible for managing the subset of the plurality of applications in the application ecosystem determined to be probable sources of the one or more issues encountered in the application ecosystem.

Figure 2:
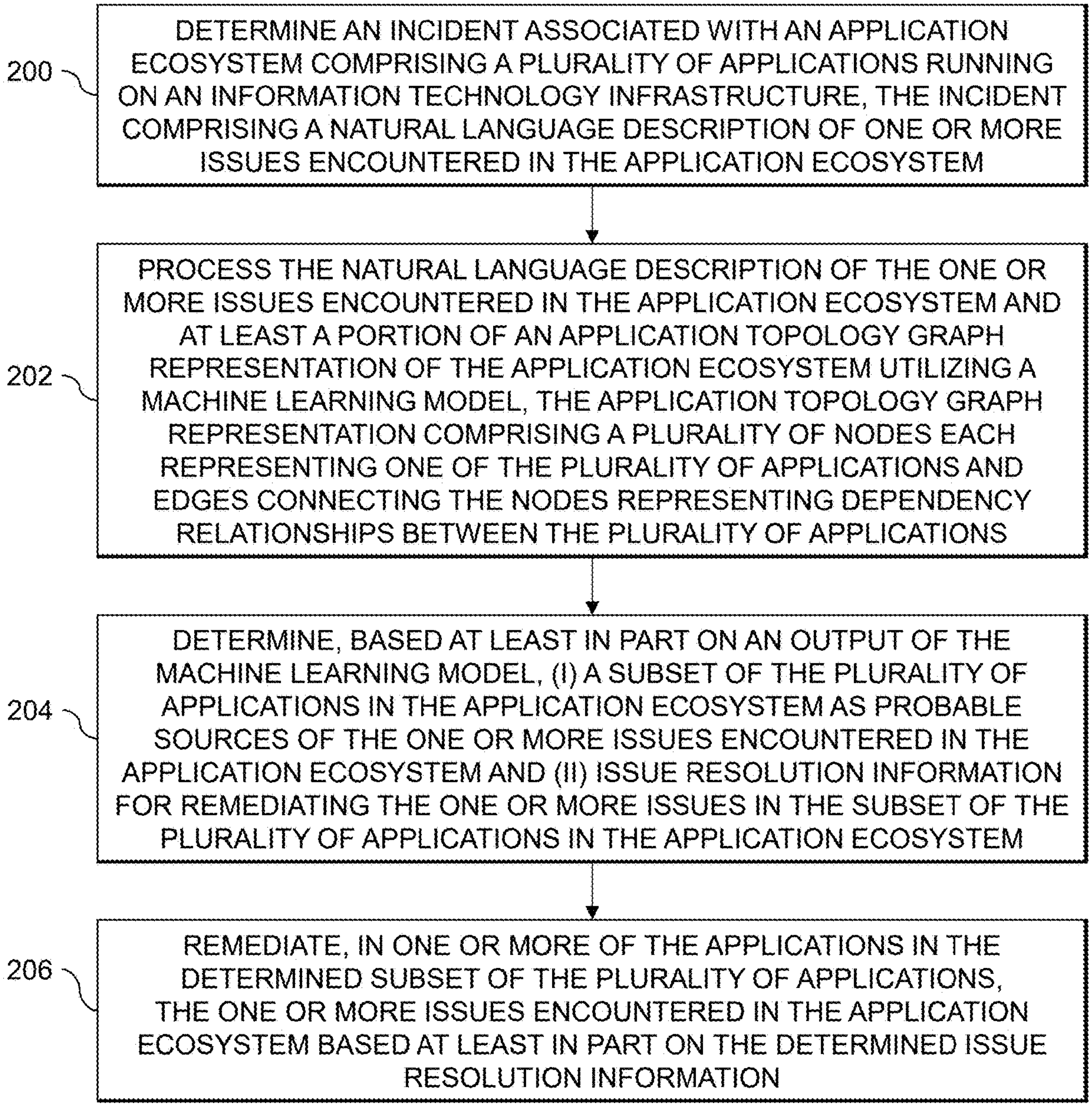
FIG. 2 is a flow diagram of an exemplary process for machine learning-based issue remediation utilizing an application topology graph representation of an application ecosystem in an illustrative embodiment.

The particular processing operations and other system functionality described in conjunction with the flow diagram of FIG. 2 are presented by way of illustrative example only, and should not be construed as limiting the scope of the disclosure in any way. Alternative embodiments can use other types of processing operations. For example, as indicated above, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different processes, etc.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Major Incident Management (MIM) plays a vital role in the operational framework of various enterprises, organization and other entities that prioritize reducing the Mean Time To Resolution (MTTR) for production issues. However, the complexity of the IT infrastructure of an enterprise, organization or other entity, which may include a large application ecosystem (e.g., with over 100 applications having various dependencies therebetween), poses a significant challenge in swiftly identifying the root cause of errors. Root cause analysis (RCA) and other issue analysis and remediation processes may span hours to days, and involves coordinating with subject matter experts (SMEs) to diagnose and troubleshoot issues. Subsequently, implementing and validating fixes to resolve such errors present a considerable challenge across various industries.

Figure 3:
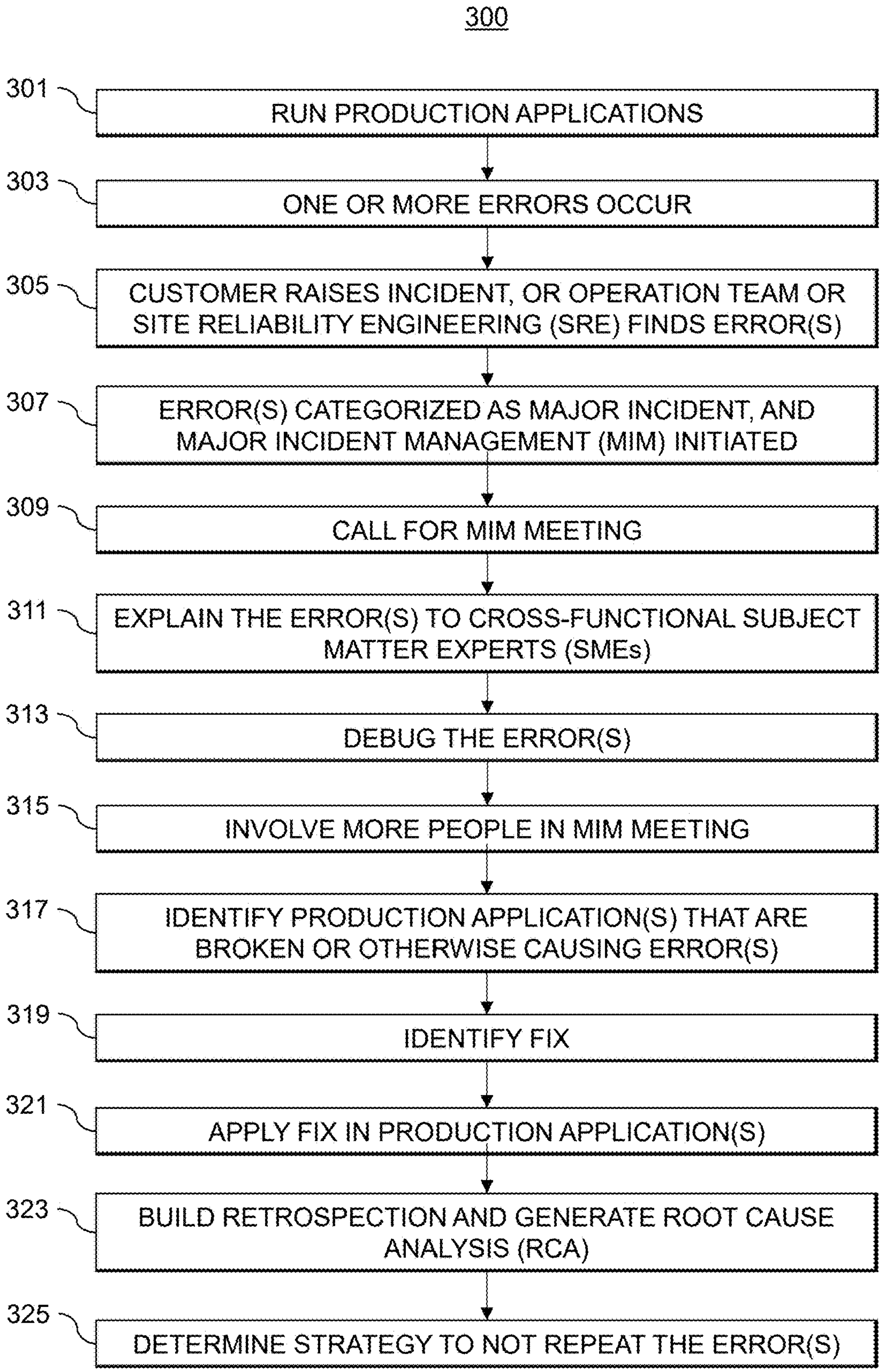
FIG. 3 shows a process flow for major incident management in an illustrative embodiment.

FIG. 3 shows a system flow 300 for incident management, where there is a set of production applications (e.g., 150+ applications) that are running in block 301, and one or more errors occur in block 303. In block 305, one or more customers raise incidents, or an operation team or site reliability engineering (SRE) finds the errors. In block 307, the errors are categorized (e.g., as one or more major incidents), and MIM processing is initiated. A MIM meeting is called in block 309, and during the MIM meeting the errors are explained to cross-functional SMEs in block 311. The errors are debugged in block 313, and then more people may be involved in the MIM meeting (e.g., based on the results of the debugging, to bring in application team members for affected applications) in block 315. One or more of the production applications that are broken or otherwise causing the errors are identified in block 317. A fix for the errors is then identified in block 319, followed by applying the fix in one or more of the production applications in block 321. A retrospective analysis and RCA are then performed for the errors in block 323, followed by determining a strategy for not repeating the errors in block 325.

As noted above, the entire MIM process (e.g., the system flow 300) can span from hours to days. The most time-consuming aspect may be the accurate identification of the application or applications which are responsible for the errors which are encountered. For instance, if the pricing on a website appears incorrect, there could be involvement from up to 15 production applications that participate in the pricing calculation for the price displayed on the website. MIM may begin with investigating the website, including the presentation layer where the pricing issue is observable. If no issue is found there, attention may shift to a Transact Pricing application programming interface (API) within the platform. However, the respective team may report no recent changes in their application, thus ruling out the possibility of their code causing the error. Subsequent inquiries may lead to considerations of the "Item-Pricer", pricing definition, or tax calculation applications, leading to iterative meetings and discussions. Eventually, after multiple iterations, the issue may be traced back to a "Quote Refresh" application failing to retrieve customer-specific discounts or performing rounding improperly. By this point, valuable time has elapsed, often spanning multiple days. Despite encountering similar errors in the past, SMEs still engage in debugging to pinpoint the issue.

Illustrative embodiments provide technical solutions for leveraging Application Topology Augmented Generative Artificial Intelligence (AI), which is configured to analyze error descriptions or behaviors to identify the most likely applications causing issues. In some embodiments, a tool referred to as a Graph Knowledge-Enhanced MIM (GK-MIM) Helper is implemented, which utilizes a Large Language Model (LLM) (e.g., a Bidirectional Encoder Representations from Transformers (BERT) model) which is augmented and trained with structured and dynamic representations of applications, including their context, relationships with other applications, historical error data, provided solutions, and potential error scenarios. An Attention Mechanism of the LLM is used to dynamically assign weights to the error location based on factors such as the last updated code in an application and contextual relevance (e.g., pricing errors receiving more attention in pricing applications). The technical solutions described herein can advantageously be used to determine the most probable location of errors and also generate probable solutions to the errors based on previous learning.

Figure 4:
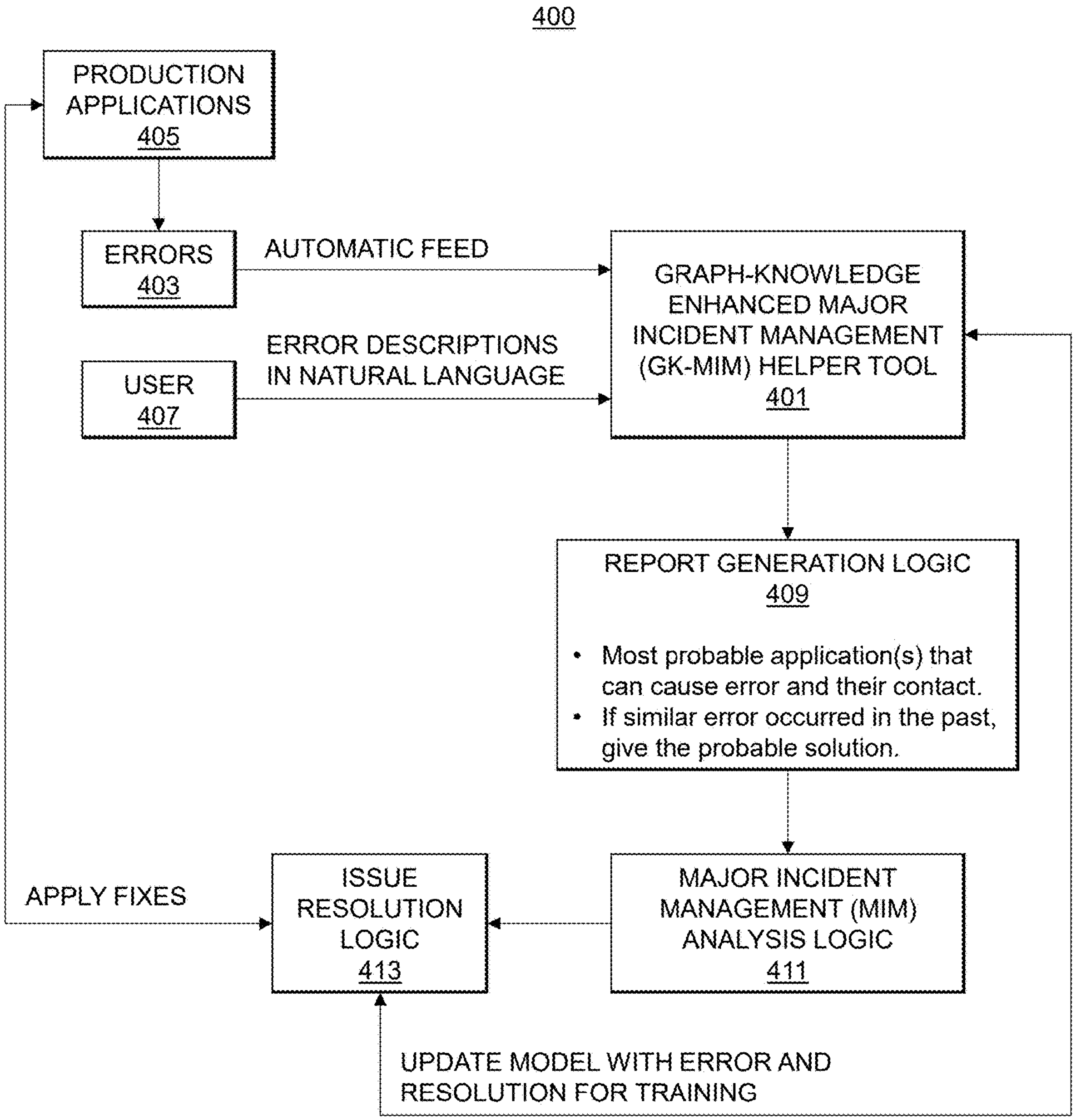
FIG. 4 shows a system configured for graph-enhanced incident management processing in an illustrative embodiment.

FIG. 4 shows a system 400 in which a GK-MIM Helper tool 401 is implemented. The GK-MIM Helper tool 401 receives an automatic feed of errors 403 which have occurred in one or more production applications 405. The GK-MIM Helper tool 401 also receives, from one or more users 407, error descriptions for the errors 403 (e.g., in natural language). The GK-MIM Helper tool 401 thus takes errors automatically from the system (e.g., the production applications 405) and/or allows the user 407 to enter the error behavior (e.g., "the pricing data is not rounding off correctly in the website checkout page"). The GK-MIM Helper tool 401 identifies the most probable ones of the production applications 405 which are involved in the errors, and generates probable solutions for the errors. This information is used by the report generation logic 409 to generate one or more reports for the encountered errors. The reports may characterize (i) the most probable applications that can cause the errors which were encountered along with their contact or location and (ii) if similar errors have occurred in the past, a probable solution to the errors which were encountered (e.g., based on the resolution of the similar historical issues). The generated reports are utilized by the MIM analysis logic 411 to analyze the errors. The MIM analysis logic 411, in some cases, may coordinate one or more MIM meetings (e.g., including distributing the generated reports to relevant SMEs or other users, inviting those users to the meetings, etc.). Based on the results of such MIM meetings, fixes for the encountered errors are identified, which are provided to issue resolution logic 413. The issue resolution logic 413 applies the fixes to the production applications 405, and updates the models utilized by the GK-MIM Helper tool 401 with the encountered errors and their resolutions for training. Use of the GK-MIM Helper tool 401 can advantageously reduce the effort and time required for the MIM process (e.g., from days to minutes or hours). Faster production error recovery leads to better customer or other user satisfaction (e.g., in order, subscription and supply chain management systems), and can increase productivity of MIM teams with quicker resolutions.

Large organizations, enterprises or other entities will likely have hundreds of applications which work in tandem to fulfill their business or other needs. Any production issues incur significant costs for an organization, making the MTTR a crucial metric. The organization may have MIM processes in place to address production issues. However, due to the large number of applications, pinpointing the exact source of an issue can be time-consuming. In conventional approaches, this may require lengthy meetings and debugging sessions, which delay error resolution and result in negative impacts on customers or other users. The technical solutions described herein utilize a graph-based approach for analyzing application context and relationships in an organization, with a dynamically assigned Attention Mechanism on most vulnerable applications for determining the context of errors. The technical solutions described herein are able to generate reports of the most probable applications that can cause a specific error in production, based on the nature and context of the error in order to streamline and reduce the time and effort required in incident management processes (e.g., including MIM processes).

In some embodiments, the technical solutions involve knowledge base preparation and informed error search. Knowledge base preparation may include generating a graph representation of the whole application ecosystem of an organization, and generation and training of an attention mechanism to mark vulnerabilities for specific application nodes in the graph for special attention while searching.

Figure 6:
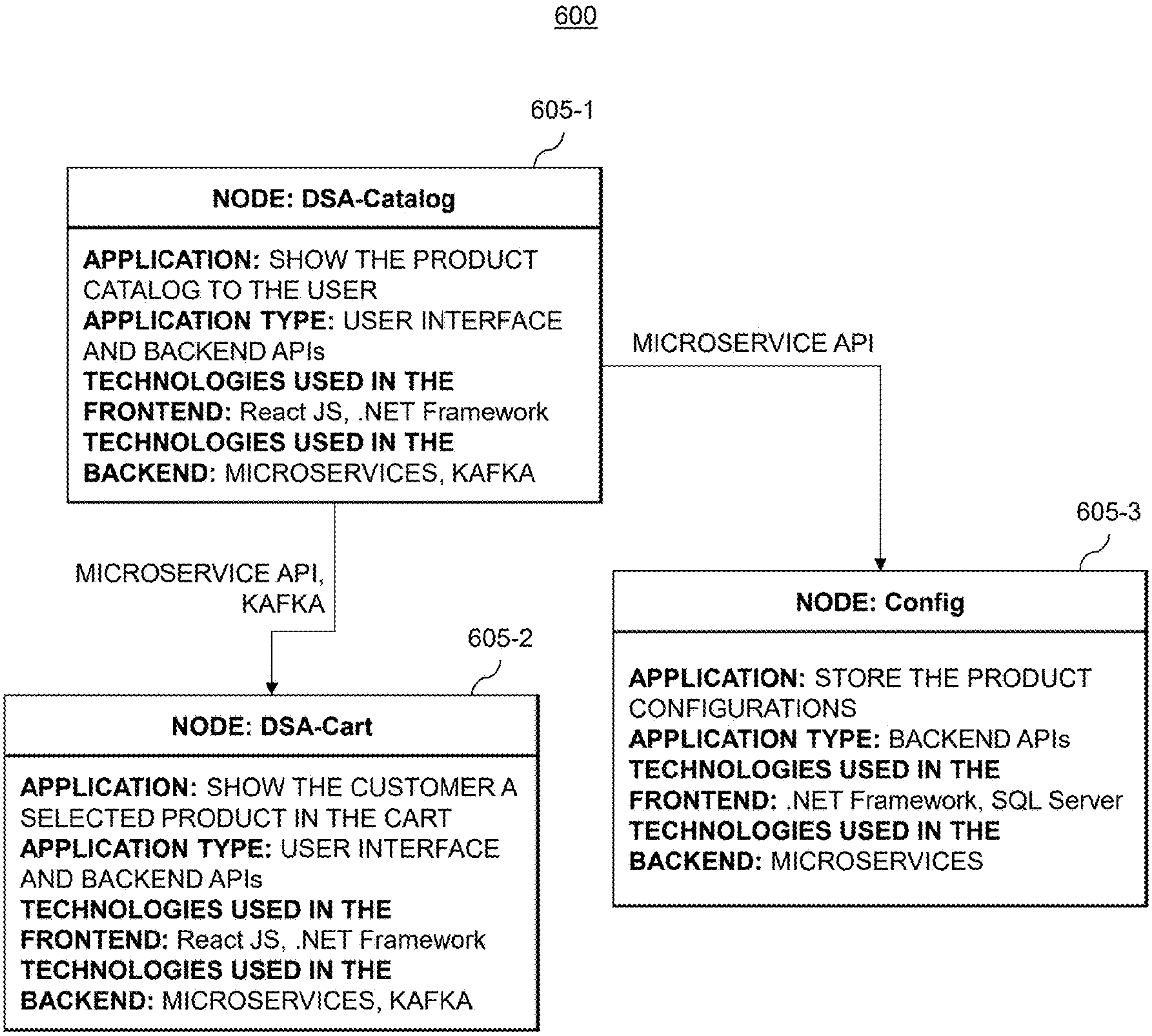
FIG. 6 shows a graph-based representation of an application ecosystem including multiple application nodes with edges between the application nodes characterizing application dependencies in an illustrative embodiment.

Knowledge base preparation will now be described in further detail. Each application in an organization's ecosystem may be treated as an "application node" in the graph representation. Once an application is registered in the system, an application node for that application is generated. The application nodes can be modules in a system. FIG. 5 shows an example application node specification 500 for a DSA-Catalog application. Each application node may have dependencies with other applications or modules, with the dependencies being represented as edges in the graph representation. An example of a dependency includes upstream applications (nodes): Config Service, Item-Pricer, Customer Interface Layer (CIL), and downstream applications (nodes): Cart Module DCQO. For each node dependency, the edge behavior is defined. The dependency may characterize a mode of communication, a contract format and an authentication model. For example, for the Config Service to DSA-Catalog (Upstream Edge), the dependency may be characterized by a Microservices API mode of communication, a JavaScript Object Notation (JSON) contract format, and an AuthN (Header) authentication model. As another example, the DSA-Catalog to Cart dependency may be characterized by Microservices API and Microservices KAFKA modes of communication, a JSON contract format, and an AuthN (Header) authentication model. FIG. 6 shows an example graph representation 600 including three nodes—a DSA-Catalog application node 605-1, a DSA-Cart application node 605-2 and a Config application node 605-3. The DSA-Catalog application node 605-1 has dependencies with the DSA-Cart application node 605-2 and the Config application node 605-3. It should be appreciated that the graph representation 600 is simplified for ease of illustration, and the DSA-Cart application may have more dependencies and as those are defined the graph representation 600 will grow.

Figure 7:
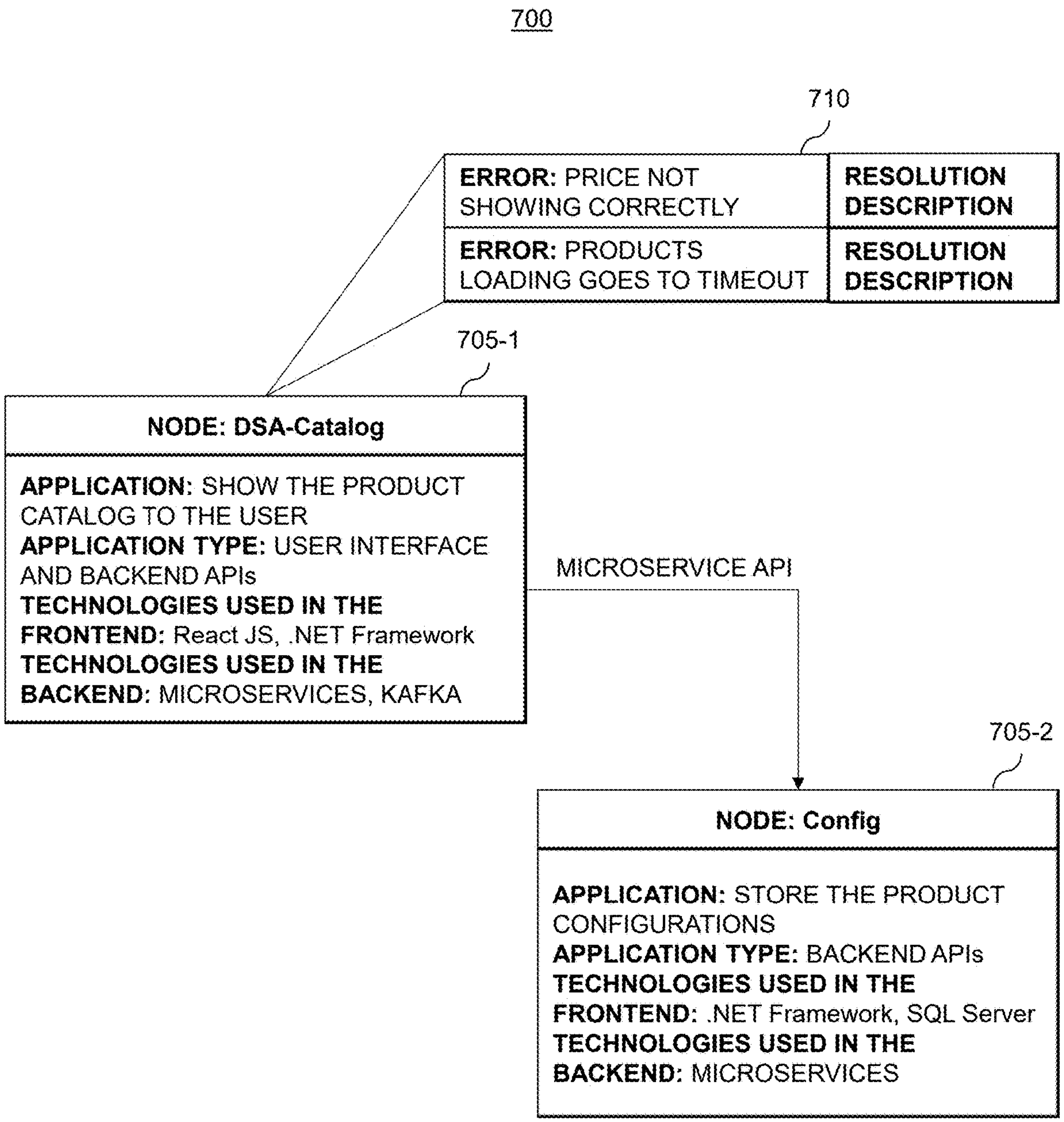
FIG. 7 shows a graph-based representation of an application ecosystem including multiple application nodes with edges between the application nodes characterizing application dependencies and with error information included as an attribute for an application node in an illustrative embodiment.

Each node and edge (e.g., application owner) defines the possible errors that can happen in those applications. The sources of such information, at least initially, may include domain knowledge and developer exception blocks, past defects and customer incidents, etc. If there was a solution already created in the past, that information can be added as a resolution description. FIG. 7 shows a graph representation 700 including a DSA-Catalog application node 705-1 that has a dependency with a Config application node 705-2. The graph representation 700 also shows the possible error and resolution information 710 for the DSA-Catalog application node 705-1. The error and resolution information 710 can be authored in the graph representation 700 as an error list, where errors may be grouped by type (e.g., user interface (UI) errors, API errors, etc.).

Once all applications are registered and configured, the graph representation will grow and cover all the applications, with their probable errors and resolution information associated with the application nodes, and the edges defining the dependencies (e.g., the modes of communication to other applications). These documents with the graph representation may be vectorized and embedded in a vector store for LLM searching.

The dynamic Attention Mechanism will now be described in further detail. In a release, there may be some applications that should be prioritized for a certain error or certain situations. Consider, for example, where an application or module has undergone code changes from the last release. In this case, that application or module should be prioritized. As another example, if an error has repeated (e.g., beyond a threshold number of times), and the cause of the error is a particular application, that application should be prioritized when similar errors come. Various other priorities may be defined by an organization as desired.

Figure 8:
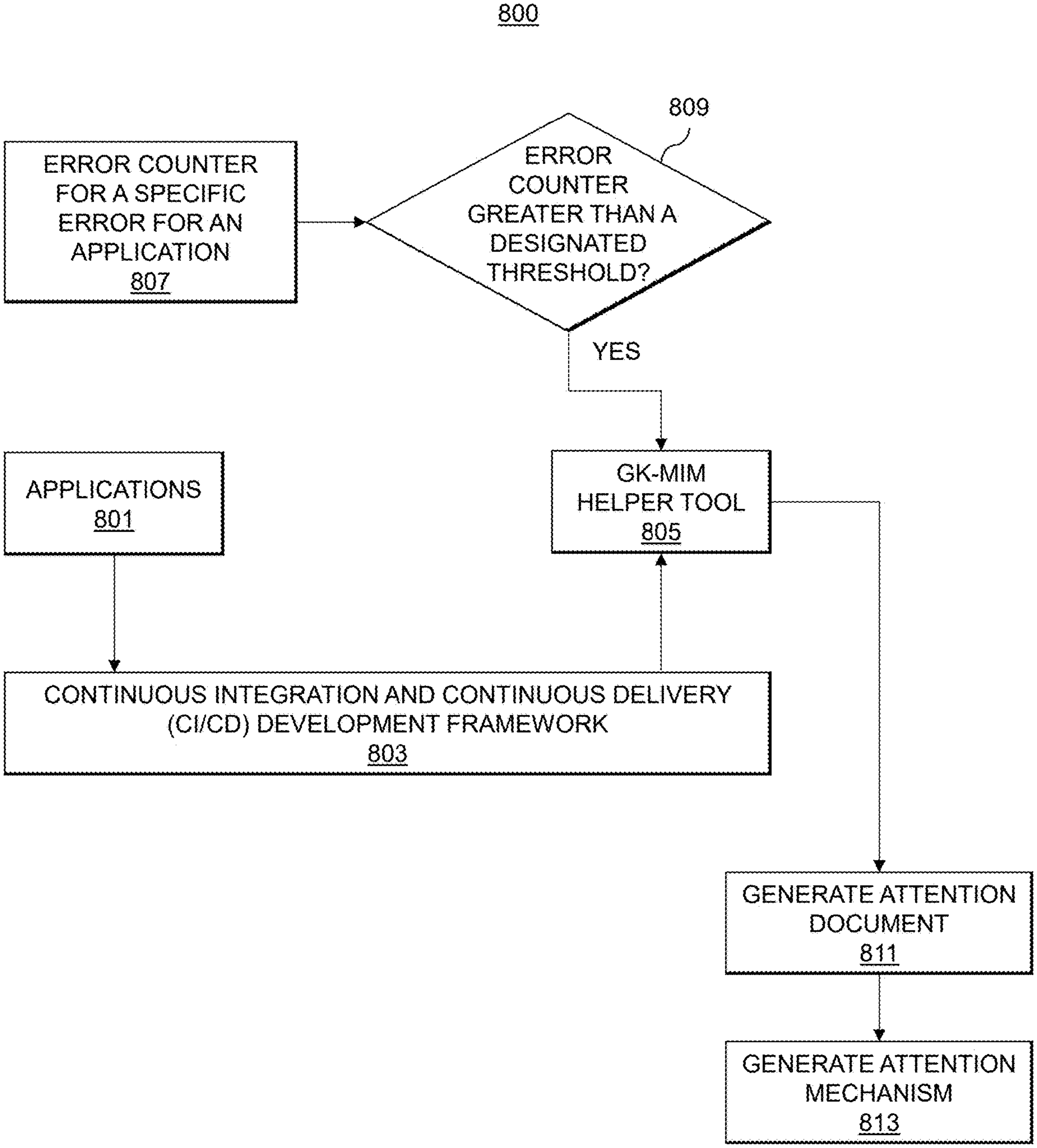
FIG. 8 shows a system flow for generating an attention mechanism for graph-enhanced incident management processing in an illustrative embodiment.

FIG. 8 shows a system flow 800 for generating an attention document. In the system flow 800, a set of applications 801 are integrated with a continuous integration and continuous delivery (CI/CD) development framework 803, which feeds information to a GK-MIM Helper tool 805. As shown, there is an error counter 807 specific to one or more of the applications 801 (e.g., there may be distinct error counters for each of the applications 801, there may be different error counters for certain groups or clusters of the applications 801, etc.). In block 809, a determination is made as to whether the current value of the error counter 807 exceeds a designated threshold (e.g., if Count>X). If so, this information is fed to the GK-MIM Helper tool 805, which generates an attention document 811 for this error and associated ones of the applications 801. The generated attention document 811 is used to generate an attention mechanism 813 that may be utilized by the GK-MIM Helper tool 805.

Figure 9:
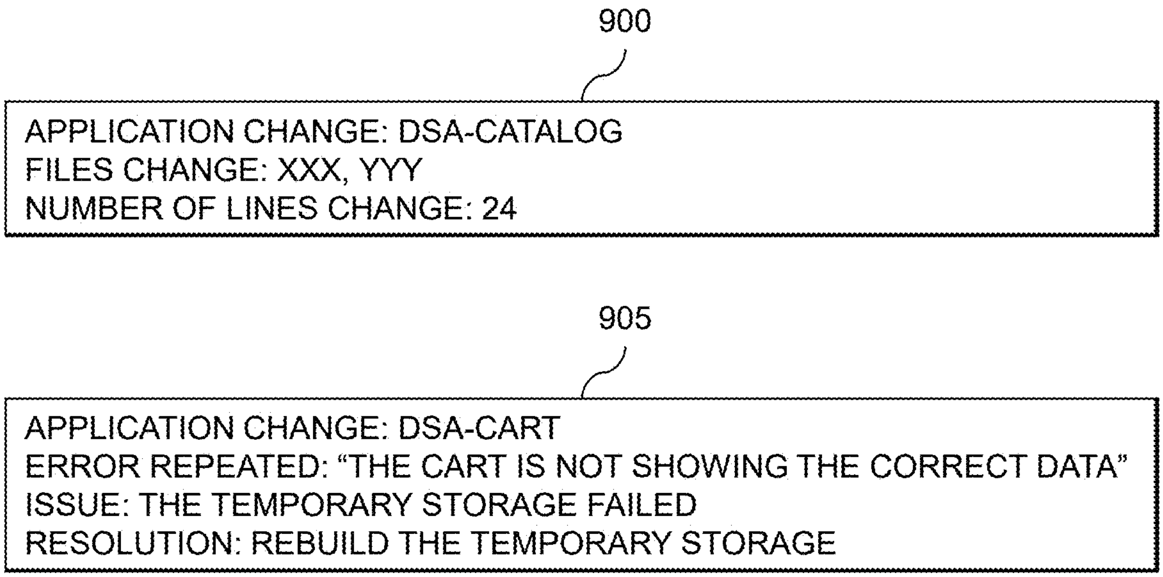
FIG. 9 shows examples of attention document data structures in an illustrative embodiment.

The CI/CD development framework 803 may be integrated and used to find recent updates of code in specific ones of the applications 801 (e.g., those associated with the error counter 807 being analyzed). The CI/CD development framework 803 may trigger the GK-MIM Helper tool 805 to generate the attention document 811. FIG. 9 shows examples of attention documents 900 and 905. The attention document 900 is for the application DSA-Catalog, and indicates the code files that have changed along with the number of lines of code that have changed. The attention document 905 is for the application DSA-Cart, indicating a repeated error, the associated system issue, and its resolution.

Generating the attention mechanism 813 may include generating attention priority tokens as part of a dynamic priority attention integrator. In some embodiments, a whole application graph is embedded in a vector format. Though the application graph is a single graph, its nodes and edges may be stored in the vector format as different documents or other data structures. For example:

$$\text{Graph } G = \{\{\text{Node1}(App1), \text{Edge1}, \text{Error}, \text{Resolution} \ldots\}, \{\text{Node2}(App2), \text{Edge2}, \text{Error}, \text{Resolution} \ldots\}\{NodeN(AppN), EdgeN, \text{Error}, \text{Resolution} \ldots\}\}$$

Here, Node1 to NodeN are different documents, which give the context of the application.

An Attention Priority Token, APT, is created dynamically when an event is triggered (e.g., on a node). The event may be, for example, detecting that source code for an application has changed, detecting a repeated error coming for a specific application, etc. There may be a set of Attention Priority Tokens:

$$APT = \{APT1, APT2, \ldots APTN\}$$

An Attention Layer may be used to integrate a Document and Role Token. The Attention Layer is applied before and after encoding the document to incorporate Role Context:

$$\text{Pre-Attention: } A1 = \text{Attention1}(APT)$$

$$\text{Post-Attention: } A2 = \text{Attention2}(\text{Node}, APT)$$

$$\text{Context Vector: } C = AttentionPool(A1, A2)$$

$$\text{Final Document Vector: } \text{Node}' = Concat(C, \text{Node})$$

This process includes the following steps:

1. Apply Pre-Attention Layer Attention1 to the Attention Priority Vector with Context of Vulnerability. This allows for selecting relevant information from the node and edge even before seeing the document. When the Attention Priority Vector is present, the search can be around that node (application).
2. Apply Post-Attention Layer Attention2 to identify the relevant vulnerability after the similarity search. This will act as a watermark for the document, telling what in the document can be analyzed. Also, this allows LLM analysis of top-down and bottom-top within a node and through edges to other applications.
3. Aggregate the pre- and post-attentions into a pooled context vector C.
4. Concatenate with the original document vector D to get a final document vector D'.

The Attention Layer (pre- and post-) is vectorized and embedded (e.g., using BERT or a Generative Pre-Trained Transformer (GPT)-like LLM). With this, the generative AI-based data structure for error location is ready for processing (e.g., informed error searching).

The informed error searching may utilize three LLM agents: (1) an Error Locator, (2) an Error Analyzer, and (3) a Report Generator. The Error Locator agent utilizes the LLM (e.g., BERT or GPT-based) to vectorize an input error and search in the graph nodes for error similarity. For example, if the error is "Pricing is not accurate" this will be vectorized and the similarity search is performed in the graph (e.g., in the error type and description attachments for the graph nodes) to locate a particular node or nodes as the most similar (e.g., Node X as the most similar node).

The Error Analyzer agent uses Reverse Traverse and the Attention Mechanism. The Reverse Traverse searches the graph for the depended applications (e.g., upstream applications) to find out if there is any attention attachment with the node. If so, the attention details are obtained (e.g., code change occurred), and then the analysis starts from that node. First, a check is performed to determine if the similarity in the input matches the description of the application for the application module. If so, that application is marked as the primary suspect. Upward applications are traversed to get the dependency (e.g., on "Pricing"). The scoring of the similarity is weighted considering the attention mechanism details. A list of applications is returned, with the list being ordered based on the similarity scores. If there is a solution already present in any of these nodes for a given error, that will also be fetched.

The Report Generator agent uses the LLM capability to generate a report for the error based on the information given by the Error Analyzer agent. The report may include, for example: (1) the error occurred application/module; (2) the most anticipated error-causing application/module; (3) dependent applications/modules; and (4) past solutions, if any. The report may also include details of the applications, and point of contact information (e.g., for IT administrators or other users who manage or are responsible for the applications).

An example implementation will now be described with respect to a set of 10 applications, denoted App1 through App10. App1 is a portal that takes an order from a customer. The other applications work in the background, and include: App2 (Products Catalog), App3 (Price Derivation for products), App4 (Cart), App5 (Checkout), App6 (Order Pipeline, where order validation is done), App7 (Order Booking), App8 (Manufacturing Application), App9 (Logistics, for shipping a manufactured product to the customer) and App10 (Portal, for the customer to register the product). Descriptions of the applications are created, along with the context of the applications, in a document or other data structure which is then added as a node to a graph representation. All possible error types and their associated error descriptions and resolutions (if any) are created and added as a document or other data structure that is attached to the node as one or more attributes. The edges between nodes are created as per different communication models, such as DATA_FLOW, DATA_DEPENDENCY, ASYC_FLOW, API_CALL, etc.

FIG. 10 shows pseudocode 1000 for creating the graph representation, including adding nodes and edges to the graph representation. FIG. 11 shows pseudocode 1100 for embedding the graph representation in a vector database. Suppose that one of the applications, App3, has undergone code changes. The CI/CD development framework will push this information to the system which will create an associated Attention Document (e.g., indicating that App3 has undergone code changes, listing the effected files such as Price_calculations.cs, Database_Connection_Factory.cs, and the number of lines changed). It should be noted that each application's Attention Layer document (if present) can be different as per the application behavior. The pre- and post-Attention Mechanism are vectorized and embedded to the effected node (e.g., for App3 in this example). At this point, the initial data setup is ready.

Consider that an error comes in App1, with the error description being "pricing calculation is not correct." This error is passed to the system. First, a cosine similarity search is performed in the graph nodes, as illustrated by the pseudocode 1200 of FIG. 12. This is used to rank the applications that can cause the error, using the application description, the error description, etc., with semantic awareness. More information on the edges will empower the LLM to get more accurate assessments of the error condition. Then, the Attention Mechanism is used to get the most vulnerable application (e.g., a most likely cause of the error). This is illustrated in the pseudocode 1300 of FIG. 13. The Report Generator agent will generate a report based on the ranking and attention scoring, indicating the most probable reason for the error. If the error has the past resolution entered in the node, that resolution may be included in the generated report. Based on the generated report, the error can be fixed in the affected applications (e.g., such as by scheduling a MIM team call or meeting, to direct members of an application team for the affected applications to fix the error, etc.). The error condition and the resolution details are used as part of a feedback loop to update the nodes in the graph representation for future error analysis.

Conventional approaches rely on manual MIM processing, which is time-consuming and error-prone. Linear embeddings with Retrieval Augmented Generation (RAG) may be used to perform inference, but may not give accurate results as all applications and error conditions are directly embedded in the vector database and thus a similarity search cannot effectively give the most probable application that can cause the error. The technical solutions described herein provide various technical advantages relative to those conventional approaches, through implementing an AI-enabled graph knowledge-enhanced incident management and report generation system. The technical solutions described herein utilize a graph-based representation of the topology of an application ecosystem, where the graph representation includes application details in nodes and applications dependencies in the edges that connect the nodes, with error information (e.g., errors and details such as descriptions, resolutions, etc.) being included as node attributes for improved semantic search using an LLM. Further, the technical solutions described herein implement an attention mechanism for prioritizing the search for a given error in the graph relationships to accurately identify the root cause of errors.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for machine learning-based issue remediation utilizing an application topology graph representation of an application ecosystem will now be described in greater detail with reference to FIGS. 14 and 15. Although described in the context of system 100, these platforms may also be used to implement at least portions of other information processing systems in other embodiments.

Figure 14:
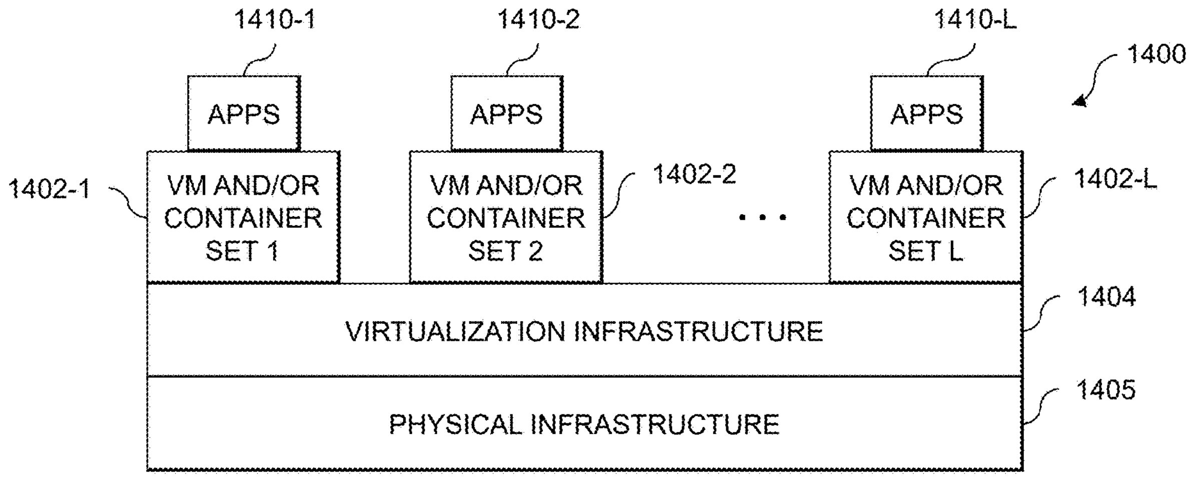
FIGS. 14 and 15 show examples of processing platforms that may be utilized to implement at least a portion of an information processing system in illustrative embodiments.
Figure 15:
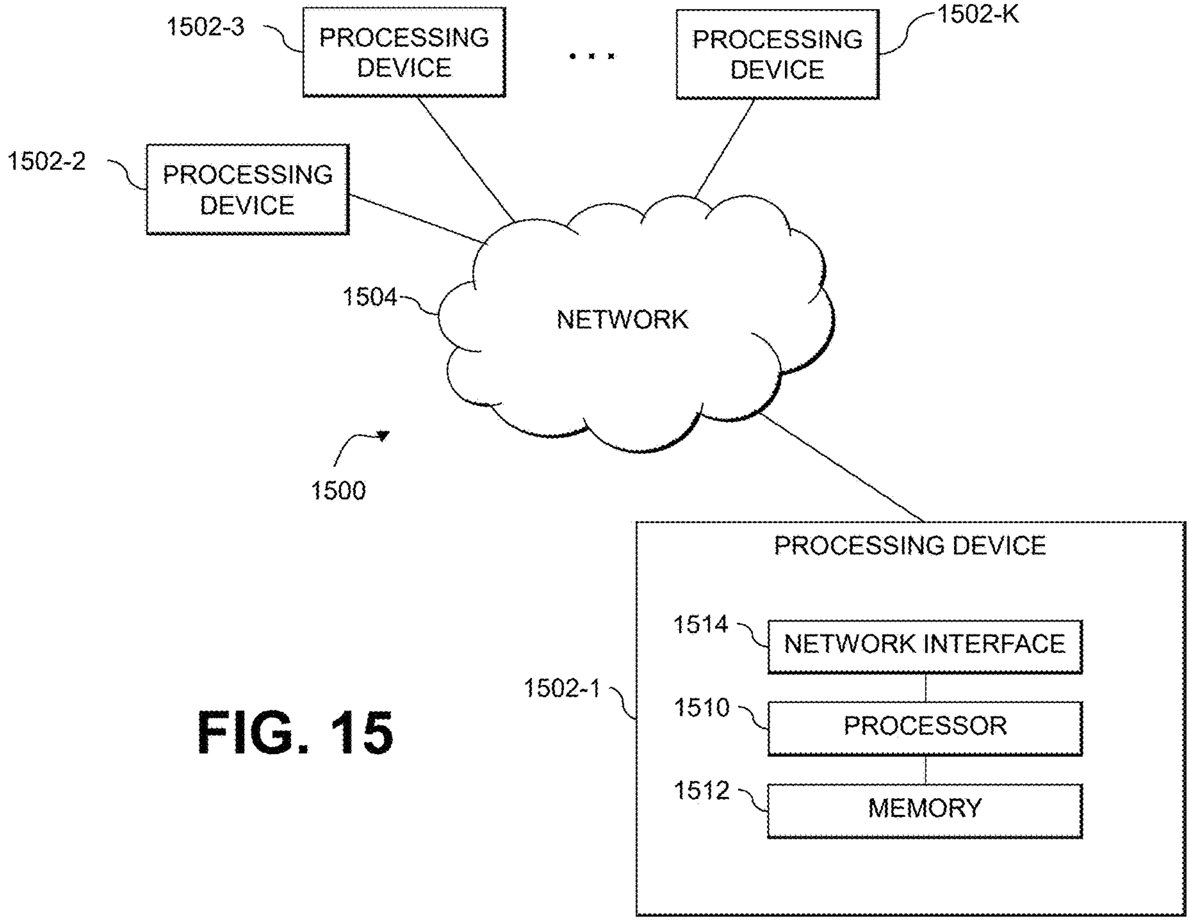

FIG. 14 shows an example processing platform comprising cloud infrastructure 1400. The cloud infrastructure 1400 comprises a combination of physical and virtual processing resources that may be utilized to implement at least a portion of the information processing system 100 in FIG. 1. The cloud infrastructure 1400 comprises multiple virtual machines (VMs) and/or container sets 1402-1, 1402-2, . . . 1402-L implemented using virtualization infrastructure 1404. The virtualization infrastructure 1404 runs on physical infrastructure 1405, and illustratively comprises one or more hypervisors and/or operating system level virtualization infrastructure. The operating system level virtualization infrastructure illustratively comprises kernel control groups of a Linux operating system or other type of operating system.

The cloud infrastructure 1400 further comprises sets of applications 1410-1, 1410-2, . . . 1410-L running on respective ones of the VMs/container sets 1402-1, 1402-2, . . . 1402-L under the control of the virtualization infrastructure 1404. The VMs/container sets 1402 may comprise respective VMs, respective sets of one or more containers, or respective sets of one or more containers running in VMs.

In some implementations of the FIG. 14 embodiment, the VMs/container sets 1402 comprise respective VMs implemented using virtualization infrastructure 1404 that comprises at least one hypervisor. A hypervisor platform may be used to implement a hypervisor within the virtualization infrastructure 1404, where the hypervisor platform has an associated virtual infrastructure management system. The underlying physical machines may comprise one or more distributed processing platforms that include one or more storage systems.

In other implementations of the FIG. 14 embodiment, the VMs/container sets 1402 comprise respective containers implemented using virtualization infrastructure 1404 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1400 shown in FIG. 14 may represent at least a portion of one processing platform. Another example of such a processing platform is processing platform 1500 shown in FIG. 15.

The processing platform 1500 in this embodiment comprises a portion of system 100 and includes a plurality of processing devices, denoted 1502-1, 1502-2, 1502-3, . . . 1502-K, which communicate with one another over a network 1504.

The network 1504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1502-1 in the processing platform 1500 comprises a processor 1510 coupled to a memory 1512.

The processor 1510 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU), a neural processing unit (NPU), a data processing unit (DPU), a System-on-Chip (SOC) or other type of processing circuitry, as well as portions or combinations of such circuitry elements.

The memory 1512 may comprise random access memory (RAM), read-only memory (ROM), flash memory or other types of memory, in any combination. The memory 1512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1502-1 is network interface circuitry 1514, which is used to interface the processing device with the network 1504 and other system components, and may comprise conventional transceivers.

The other processing devices 1502 of the processing platform 1500 are assumed to be configured in a manner similar to that shown for processing device 1502-1 in the figure.

Again, the particular processing platform 1500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for machine learning-based issue remediation utilizing an application topology graph representation of an application ecosystem as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, IT assets, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:

at least one processing device comprising a processor coupled to a memory;

the at least one processing device being configured:

to determine an incident associated with an application ecosystem comprising a plurality of applications running on an information technology infrastructure, the incident comprising a natural language description of one or more issues encountered in the application ecosystem;

to generate an application topology graph representation of the application ecosystem, the application topology graph representation comprising a plurality of nodes each representing one of the plurality of applications and edges connecting the nodes representing dependency relationships between the plurality of applications;

to detect one or more code changes associated with software code of at least one of the plurality of applications in the application ecosystem;

to update at least one of the plurality of nodes of the application topology graph representation of the application ecosystem representing the at least one application in the application ecosystem with attention information characterizing the detected one or more code changes associated with the software code of the at least one application;

to process the natural language description of the one or more issues encountered in the application ecosystem and at least a portion of the application topology graph representation of the application ecosystem utilizing a machine learning model, the machine learning model comprising an attention layer configured to perform a semantic search of the application topology graph representation utilizing the attention information;

to determine, based at least in part on an output of the machine learning model, (i) a subset of the plurality of applications in the application ecosystem as probable sources of the one or more issues encountered in the application ecosystem and (ii) issue resolution information for remediating the one or more issues in the subset of the plurality of applications in the application ecosystem; and to remediate, in one or more of the applications in the determined subset of the plurality of applications, the one or more issues encountered in the application ecosystem based at least in part on the determined issue resolution information.

2. The apparatus of claim 1 wherein a given application node in the application topology graph representation specifies a given one of the plurality of applications, an application type of the given application, one or more front-end technologies utilized by the given application, and one or more back-end technologies utilized by the given application.

3. The apparatus of claim 1 wherein a given edge in the application topology graph representation between a first application node associated with a first one of the plurality of applications and a second application node associated with a second one of the plurality of applications specifies a mode of communication between the first application and the second application, a communication format utilized for the communication between the first application and the second application, and an authentication model utilized for the communication between the first application and the second application.

4. The apparatus of claim 1 wherein at least a given one of the nodes of the application topology graph representation for a given one of the plurality of applications is associated with issue attribute information, the issue attribute information characterizing one or more historical issues encountered on the given application and issue resolution information for the one or more historical issues.

5. The apparatus of claim 1 wherein the attention information associated with said at least one of the nodes of the application topology graph representation is generated in response to detecting one or more attention conditions.

6. The apparatus of claim 5 wherein the one or more attention conditions comprise detecting the one or more code changes in a most recent release of the at least one application, and wherein the attention information characterizes one or more code files of the at least one application having the one or more code changes and a number of lines of the software code that have changed.

7. The apparatus of claim 5 wherein the one or more attention conditions comprise detecting a given issue that is repeated at least a threshold number of times in the at least one application within a given time frame, and wherein the attention information characterizes a description of the given issue and a resolution of the given issue.

8. The apparatus of claim 1 wherein the machine learning model comprises a Large Language Model (LLM).

9. The apparatus of claim 8 wherein the LLM comprises an error locator agent configured to vectorize the natural language description of the one or more issues encountered in the application ecosystem and perform a similarity search of error attribute information associated with the plurality of nodes of the application topology graph representation.

10. The apparatus of claim 8 wherein the LLM comprises an error analyzer agent configured to implement a reverse traverse search of dependent nodes in the application topology graph representation starting from ones of the plurality of nodes determined to have associated error attribute information similar to the natural language description of the one or more issues encountered in the application ecosystem or ones of the plurality of nodes having associated attention information.

11. The apparatus of claim 8 wherein the LLM comprises a report generator agent configured to generate a report characterizing: a first set of one or more of the plurality of applications in the application ecosystem in which the one or more issues occurred or are determined to be a cause of the one or more issues, a second set of one or more of the plurality of applications in the application ecosystem having dependencies with the first set of one or more of the plurality of applications in the application ecosystem, and potential remediation actions for the one or more issues.

12. The apparatus of claim 8 wherein the LLM is configured to operate on vectorized embeddings of the application topology graph representation, wherein the vectorized embeddings comprise a vector embedding data structure associated with each of the plurality of nodes of the application topology graph representation, the vector embedding data structure characterizing error attribute information associated with each of the plurality of nodes of the application topology graph representation and any available attention information for the plurality of nodes of the application topology graph representation.

13. The apparatus of claim 1 wherein remediating the one or more issues encountered in the application ecosystem based at least in part on the determined issue resolution information comprises alerting one or more users responsible for managing the subset of the plurality of applications in the application ecosystem determined to be probable sources of the one or more issues encountered in the application ecosystem.

14. The apparatus of claim 1 wherein the machine learning model utilizes a transformer architecture.

15. The apparatus of claim 14 wherein the transformer architecture comprises a Bidirectional Encoder Representations from Transformers (BERT) model.

16. The apparatus of claim 14 wherein the transformer architecture comprises a generative pre-trained transformer (GPT) model.

17. A computer program product comprising a non-transitory processor-readable storage medium having stored therein program code of one or more software programs, wherein the program code when executed by at least one processing device causes the at least one processing device:

to determine an incident associated with an application ecosystem comprising a plurality of applications running on an information technology infrastructure, the incident comprising a natural language description of one or more issues encountered in the application ecosystem;

to generate an application topology graph representation of the application ecosystem, the application topology graph representation comprising a plurality of nodes each representing one of the plurality of applications and edges connecting the nodes representing dependency relationships between the plurality of applications;

to detect one or more code changes associated with software code of at least one of the plurality of applications in the application ecosystem;

to update at least one of the plurality of nodes of the application topology graph representation of the application ecosystem representing the at least one application in the application ecosystem with attention information characterizing the detected one or more code changes associated with the software code of the at least one application;

to process the natural language description of the one or more issues encountered in the application ecosystem and at least a portion of the application topology graph representation of the application ecosystem utilizing a machine learning model, the machine learning model comprising an attention layer configured to perform a semantic search of the application topology graph representation utilizing the attention information;

to determine, based at least in part on an output of the machine learning model, (i) a subset of the plurality of applications in the application ecosystem as probable sources of the one or more issues encountered in the application ecosystem and (ii) issue resolution information for remediating the one or more issues in the subset of the plurality of applications in the application ecosystem; and to remediate, in one or more of the applications in the determined subset of the plurality of applications, the one or more issues encountered in the application ecosystem based at least in part on the determined issue resolution information.

18. The computer program product of claim 17 wherein given one of the nodes of the application topology graph representation for a given one of the plurality of applications is associated with issue attribute information, the issue attribute information characterizing one or more historical issues encountered on the given application and issue resolution information for the one or more historical issues.

19. A method comprising:

determining an incident associated with an application ecosystem comprising a plurality of applications running on an information technology infrastructure, the incident comprising a natural language description of one or more issues encountered in the application ecosystem;

generating an application topology graph representation of the application ecosystem, the application topology graph representation comprising a plurality of nodes each representing one of the plurality of applications and edges connecting the nodes representing dependency relationships between the plurality of applications;

detecting one or more code changes associated with software code of at least one of the plurality of applications in the application ecosystem;

updating at least one of the plurality of nodes of the application topology graph representation of the application ecosystem representing the at least one application in the application ecosystem with attention information characterizing the detected one or more code changes associated with the software code of the at least one application;

processing the natural language description of the one or more issues encountered in the application ecosystem and at least a portion of the application topology graph representation of the application ecosystem utilizing a machine learning model, the machine learning model comprising an attention layer configured to perform a semantic search of the application topology graph representation utilizing the attention information;

determining, based at least in part on an output of the machine learning model, (i) a subset of the plurality of applications in the application ecosystem as probable sources of the one or more issues encountered in the application ecosystem and (ii) issue resolution information for remediating the one or more issues in the subset of the plurality of applications in the application ecosystem; and remediating, in one or more of the applications in the determined subset of the plurality of applications, the one or more issues encountered in the application ecosystem based at least in part on the determined issue resolution information;

wherein the method is performed by at least one processing device comprising a processor coupled to a memory.

20. The method of claim 19 wherein a given one of the nodes of the application topology graph representation for a given one of the plurality of applications is associated with issue attribute information, the issue attribute information characterizing one or more historical issues encountered on the given application and issue resolution information for the one or more historical issues.

* * * * *